United States Patent
Williams et al.

(10) Patent No.: US 9,621,440 B2
(45) Date of Patent: Apr. 11, 2017

(54) SYSTEM AND METHOD FOR VALIDATING DOCUMENTATION OF REPRESENTATIONAL STATE TRANSFER (REST) SERVICES

(71) Applicants: Jorge Luis Williams, San Antonio, TX (US); David Cramer, San Antonio, TX (US)

(72) Inventors: Jorge Luis Williams, San Antonio, TX (US); David Cramer, San Antonio, TX (US)

(73) Assignee: Rackspace US, Inc., San Antonio, TX (US)

(*) Notice: Subject to any disclaimer, the term of this patent is extended or adjusted under 35 U.S.C. 154(b) by 432 days.

(21) Appl. No.: 14/013,930

(22) Filed: Aug. 29, 2013

(65) Prior Publication Data
US 2014/0068047 A1    Mar. 6, 2014

Related U.S. Application Data

(60) Provisional application No. 61/695,728, filed on Aug. 31, 2012.

(51) Int. Cl.
 *G06F 15/173* (2006.01)
 *H04L 12/24* (2006.01)
 *H04L 12/26* (2006.01)
 *H04L 29/08* (2006.01)

(52) U.S. Cl.
 CPC .......... *H04L 41/5077* (2013.01); *H04L 43/50* (2013.01); *H04L 67/02* (2013.01)

(58) Field of Classification Search
 CPC ...... H04L 41/5077; H04L 43/50; H04L 67/02
 USPC .......................................................... 709/223
 See application file for complete search history.

(56) References Cited

U.S. PATENT DOCUMENTS

| | | | | |
|---|---|---|---|---|
| 8,930,330 B1* | 1/2015 | Arguelles | ............... | G06Q 10/10 707/694 |
| 2009/0327868 A1* | 12/2009 | Tsukikawa | .............. | G06F 9/541 715/239 |
| 2011/0131567 A1* | 6/2011 | Tirk | .......................... | G06F 8/60 717/176 |
| 2011/0161477 A1* | 6/2011 | Kowalski | ............ | H04L 67/2823 709/223 |
| 2011/0320503 A1* | 12/2011 | George | ................... | H04L 67/16 707/803 |
| 2012/0046966 A1* | 2/2012 | Chang | .................... | G06Q 50/24 705/3 |
| 2012/0089841 A1* | 4/2012 | Boyer | ..................... | G06F 21/64 713/175 |

(Continued)

*Primary Examiner* — Joseph Greene
(74) *Attorney, Agent, or Firm* — Haynes and Boone, LLP (57) ABSTRACT

A validation tool is provided for a representational state transfer (REST) service. In one embodiment, a method for validating documentation of a REST service includes including detecting one or more messages for a REST service by a validator, wherein the one or more messages are intercepted for the REST service, translating documentation of the REST service, by the validator, into a representation of an automaton, and validating the one or more messages by the validator based on the automaton, wherein validation of the messages determines conformance of the REST service to the documentation of the REST service.

36 Claims, 10 Drawing Sheets

(56) References Cited

U.S. PATENT DOCUMENTS

2012/0158825 A1* 6/2012 Ganser ............... G06F 17/3089
709/203
2012/0304275 A1* 11/2012 Ji ....................... H04L 63/0245
726/11
2014/0289702 A1* 9/2014 McMahon ............. G06F 21/60
717/120

* cited by examiner

```xml
<?xml version="1.0" encoding="UTF-8"?>
<checker xmlns="http://www.rackspace.com/repose/wadl/checker"
    xmlns:xs="http://www.w3.org/2001/XMLSchema">
    <step id="S0" type="START" next="d1e4 SE1 d21e2u"/>
    <step type="URL_FAIL" id="d21e2u" notMatch="path"/>
    <step type="URL" id="d1e4" match="path" next="d1e5 SE1 d21e3u"/>
    <step type="URL_FAIL" id="d21e3u" notMatch="to"/>
    <step type="URL" id="d1e5" match="to" next="d1e6 SE1 d21e4u"/>
    <step type="URL_FAIL" id="d21e4u" notMatch="record"/>
    <step type="URL" id="d1e6" match="record" next="d1e7 SE1 d21e5u"/>
    <step type="URL_FAIL" id="d21e5u" notTypes="xs:date"/>
    <step type="URLXSD"
        id="d1e7"
        match="xs:date"
        label="date"
        next="d1e9 d21e6m SE0"/>
    <step type="METHOD_FAIL" id="d21e6m" notMatch="GET"/>
    <step type="METHOD" id="d1e9" match="GET" next="SA"/>
    <step id="SE0" type="URL_FAIL"/>
    <step id="SE1" type="METHOD_FAIL"/>
    <step id="SA" type="ACCEPT"/>
</checker>
```

FIGURE 4

```
<?xml version="1.0" encoding="UTF-8"?>

<application xmlns="http://wadl.dev.java.net/2009/02"
    xmlns:widget="http://rackspace.com/sample/widget"
    xmlns:xs="http://www.w3.org/2001/XMLSchema">
    <grammars>
        <include href="widget.xsd"></include>
    </grammars>
    <resources base="http://localhost/">
        <resource path="widget">
            <param style="template" type="xs:date" name="date"/>
            <!-- The PUT operation allows all widgets as request
                representation. -->
            <method name="PUT">
                <request>
                    <representation mediaType="application/xml" element="widget:widget"/>
                </request>
                <response>
                    <representation mediaType="applicaiton/xml" element="widget:widget"/>
                </response>
            </method>
            <!-- The POST operation allows only widgets of the restricted type WidgetForCreate -->
            <method name="POST">
                <request>
                    <representation mediaType="application/xml" element="widget:widget">
                        <param style="plain" path="/widget:widget" type="widget:WidgetForCreate"/>
                    </representation>
                </request>
                <response>
                    <representation mediaType="applicaiton/xml" element="widget:widget"/>
                </response>
            </method>
        </resource>
    </resources>
</application>
```

```
            <resource queryType="application/x-www-form-urlencoded" path="c">
                <method xmlns:rax="http://docs.rackspace.com/api" rax:id="foo"/>
            </resource>
          </resource>
        </resource>
        <resource queryType="application/x-www-form-urlencoded" path="d">
          <resource queryType="application/x-www-form-urlencoded" path="e">
            <resource queryType="application/x-www-form-urlencoded" path="f"/>
          </resource>
        </resource>
        <resource queryType="application/x-www-form-urlencoded" path="g"/>
        <resource queryType="application/x-www-form-urlencoded" path="h">
          <resource queryType="application/x-www-form-urlencoded" path="i">
            <resource queryType="application/x-www-form-urlencoded" path="{j}">
              <param name="j" style="template" type="xsd:string" required="true" repeating="false"/>
              <resource queryType="application/x-www-form-urlencoded" path="k">
                <method xmlns:rax="http://docs.rackspace.com/api" rax:id="foo"/>
                <resource queryType="application/x-www-form-urlencoded" path="l">
                  <method xmlns:rax="http://docs.rackspace.com/api" rax:id="foo"/>
                </resource>
              </resource>
            </resource>
          </resource>
        </resource>
      </resource>
    </resources>
    <method id="foo"/>
</application>
        when("the WADL is normalized")
        val normWADL = wadl.normalize(inWADL, TREE)
        then("the resources should now be in tree format")
        canon(treeWADL) should equal (canon(normWADL))
    }
```

```
scenario ("The original WADL is in mixed path/tree format"){
    given("a WADL with resources in mixed path/tree format")
    val inWADL =
<application xmlns="http://wadl.dev.java.net/2009/02"
    xmlns:xsd="http://www.w3.org/2001/XMLSchema">
  <resources base="https://test.api.openstack.com">
    <resource path="a/b">
      <resource path="c">
      <method href="#foo"/>
      </resource>
    </resource>
    <resource path="d">
      <resource path="e/f"/>
    </resource>
    <resource path="g"/>
    <resource path="h/i/{j}/k">
      <param name="j" style="template" type="xsd:string" required="true"/>
      <method href="#foo"/>
    </resource>
    <resource path="h/i/{j}/k/l">
      <method href="#foo"/>
    </resource>
  </resources>
  <method id="foo"/>
</application>
    val treeWADL =
<application xmlns="http://wadl.dev.java.net/2009/02"
     xmlns:xsd="http://www.w3.org/2001/XMLSchema">
  <resources base="https://test.api.openstack.com">
    <resource queryType="application/x-www-form-urlencoded" path="a">
      <resource queryType="application/x-www-form-urlencoded" path="b">
```

FIGURE 10-1

SYSTEM AND METHOD FOR VALIDATING DOCUMENTATION OF REPRESENTATIONAL STATE TRANSFER (REST) SERVICES

CROSS-REFERENCE TO RELATED APPLICATIONS

This application claims the benefit under 35 U.S.C. §119 (e) of provisional application No. 61/695,728, filed Aug. 31, 2012, which is entitled "System and Method for Validating Documentation of Representational State Transfer (Rest) Service," which is incorporated herein by reference.

BACKGROUND

REST (REpresentational State Transfer) is an "architectural style" described by Roy Fielding in his PhD dissertation Fielding2000. REST seeks to adapt the architecture of the Web, along with its scalability, performance, and other advantages, as a platform for any kind of application. In REST, as on the Web, a resource is an item of interest. Each resource has an address (URI) and one or more representations (a file with a given media type). A client can interact with a resource through a URL and these interactions in turn act as the engine of application state because the representations provide hypermedia links offering alternative directions the client can take to proceed through the workflow. The RESTful ideal is that just as you interact with a Web site and choose which step to take next, without being frustrated that the layout of the page and links offered have changed since the last time you visited the site, so a client using a RESTful API can pick its way through a workflow without demanding a fixed, brittle contract. Likewise, the Web's mature and well-understood caching mechanisms can improve the performance and scalability of your application, protecting the server from spikes in traffic and the client from brief interruptions in the server's availability.

While many APIs describe themselves as RESTful, some RESTful APIs are more RESTful than others. At the most rudimentary level, APIs may employ one or more URIs, but still use only one method (GET, POST) to tunnel their requests over HTTP and do not represent a radical break from WS-* services. APIs that embrace the RESTful architecture more fully offer a larger number of resources, each with a URI, and map a variety of HTTP verbs to the Create Read Update Delete (CRUD) operations found in most applications. In these services, parameters are passed in with requests either as elements of the URI or as query parameters appended to the URI. The Web's caching infrastructure also comes into play. Finally, in an ideal more often discussed than achieved, services that fully embrace the idea of hypermedia as the engine of application state (HATEOS), relying on the client to navigate through the workflow in the same way an end-user at an e-commerce site would, by inspecting the available links and picking the appropriate one.

As a REST service is being developed, the goal is to ensure that the documentation accurately matches the implementation. Once a REST service reaches a mature state, or is released publicly, the documentation becomes a contract; both clients and alternate implementations use this contract to guide their development. Interoperability between all parties requires that both the documentation and the implementation remain stable, even in the face of bug fixes, upgrades, enhancements, and the introduction of new features via extensions.

In the presence of these changes, there always exists the possibility that either REST service implementation or documents may inadvertently drift from one another. This drift often introduces incompatibilities that can cause clients to fail. Thus, it is important to constantly test that the implementation and documentation of a REST service conform to one another. Unfortunately, document conformance is typically not focused on, nor the intricate details of the REST/HTTP aspects of the service. Instead, testing typically focuses on the functionality of a REST service itself which can result in a number of incompatibilities. Because a focus on functional testing has little to no regard to documentation of the service, cases may arise where both the implementation and testing of a REST service drift away from the documents simultaneously. Adding to the complexity is the fact that service developers tend to allow their implementations to be flexible and loose when accepting messages from clients—this means that conformance and functional tests may inadvertently drift from the service contract without notice.

Accordingly, it is desirable to validate documentation of a REST service during development.

BRIEF DESCRIPTION OF THE DRAWINGS

FIG. 8b illustrates a graphical representation of the effect of running optimization stages on the automaton of FIG. 8a.

SUMMARY OF THE INVENTION

In one exemplary aspect, the present disclosure is directed to method for validating documentation of representational state transfer (REST) service. The method includes detecting one or more messages for a REST service by a validator, wherein the one or more messages are intercepted by the validator for the REST service, translating, by the validator, documentation of the REST service into a representation of an automaton, and validating the one or more messages by the validator based on the automaton, wherein validation of the messages determines conformance of the REST service to the documentation of the REST service.

In another exemplary aspect, the present disclosure is directed to a non-transitory computer-accessible storage medium storing program instructions that when executed by a computer cause the computer to implement a representational state transfer (REST) service validator. The validator configured to detect one or more messages for a REST service, wherein the one or more messages are intercepted by the validator for the REST service, translate documentation of the REST service into a representation of an automaton, and validate the one or more messages based on the automaton, wherein validation of the messages determines conformance of the REST service to the documentation of the REST service.

DETAILED DESCRIPTION

The following disclosure describes one or more embodiments for validating documentation of a representational state transfer (REST) service. In on embodiment, documentation of a REST service is incorporated in the testing process of a REST service in an automated way. According to another embodiment, a documentation pipeline is configured to generate validation rules that can be checked in a layer between the function tests and service itself.

REST Validator

One embodiment is directed to a method for validating documentation of a REST service. In particular, a the method is provided for addressing one or more of the issues described below with respect to validation of a REST service.

Accordingly, a system and method for validation are provided that better incorporates the documentation in the testing process in an automated way. In one embodiment, a documentation pipeline is used to generate validation rules that can be checked in a layer between the function tests and the service itself.

Figure 1:
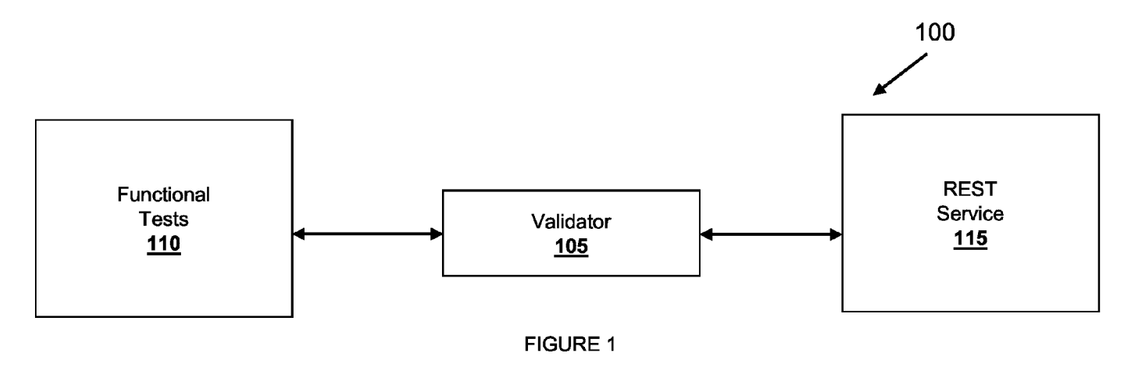
FIG. 1 is a graphical representation of a computing system.

Referring now to FIG. 1, a graphical representation is depicted of a computing system 100 including a validator 105 to validate representational state transfer (REST) services. REST validator 105 intercepts requests (e.g., messages) from the functional tests 110 before the requests reach the REST service 115. The requests may be at least one of client and server application messages and can include one or more messages. In certain embodiments, the requests are functional tests messages for testing functions of the REST service.

REST validator 105 checks requests for strict conformance to documentation of the REST service. In one embodiment, the documentation is a machine readable description of the XML Web Application Description Language (WADL). REST validator 105 intercepts and validates responses from the REST service. One advantage of REST validator 105 may be the ability to ensure that the validator is strictly accurate with conformance to documents of the REST service because the validation rules are generated directly from the documentation. Another advantage may be that the validator 105 can check for drift by both the functional tests 110 and REST service 115 simultaneously because the validator 105 sits between the functional tests 110 and the REST service 115. Another advantage may be that validator 105 can be easily incorporated into existing services as the method and system of FIG. 1 does not require changes to existing functional tests.

According to one embodiment, validator 105 can validate documentation of a representational state transfer (REST) service. In one embodiment, validator 105 is configured to detect one or more messages for a REST service by a validator, wherein the one or more messages are intercepted by the validator for the REST service. Validator 105 can translate documentation of the REST service into a representation of an automaton, and validate the one or more messages by the validator based on the automaton, wherein validation of the messages determines conformance of the REST service to the documentation of the REST service. Translating documentation of the REST service by validator 105 can include parsing the documentation, validating the documentation against schema, and normalizing the documentation. The automaton can be a representation in an XML format of URL paths and URI resources for validating messages for the REST service. Validator 105 may be configured to optimize an automaton determined for a REST service. In certain embodiments, validator 105 may be embodied in a non-transitory computer-accessible storage medium, the non-transitory computer-accessible storage medium storing program instructions that when executed by a computer cause the computer to implement the representational state transfer (REST) service validator.

According to another embodiment, validator 105 is an intermediary approach for performing validation, where messages are intercepted between client and server applications and an automata-based programming approach that enables the efficient validation of messages at run-time. Although depicted as a separate element from REST service 115 in FIG. 1, validator 105 can be incorporated into existing REST services and does not require a change to existing functions of the REST service. As will be described in more detail below, validation by validator 105 may be configured for one or more of filtering, accurate error reporting, authorization, and API coverage. According to another embodiment, validation may be based on a tag set chosen to semantically describe all aspects of a RESTful service and contain author friendly features.

Figure 2:
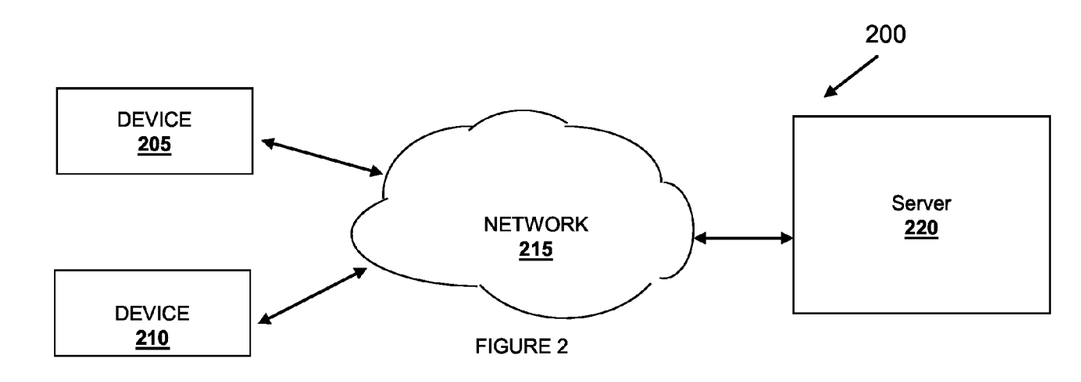
FIG. 2 is a diagram of an information processing system configured to host one or more machines.

Referring now to FIG. 2, diagram 200 shows an information processing system 200 including sever 220 configured to host one or more machines, such as device 205 and device 210 coupled to network 215. Examples of information processing systems include a server computer, a personal computer (e.g., a desktop computer or a portable computer such as, for example, a laptop computer), a handheld computer, and/or a variety of other information handling systems known in the art. The information processing system 200 shown is representative of, one of, or a portion of, the information processing systems described above.

The information processing system 200 and one or more of device 205, device 210 and server 220 may include any or all of the following: (a) a processor for executing and otherwise processing instructions, (b) one or more network interfaces (e.g., circuitry) for communicating between the processor and other devices, those other devices possibly located across the network 215; (c) a memory device (e.g., FLASH memory, a random access memory (RAM) device or a read-only memory (ROM) device for storing information (e.g., instructions executed by processor and data operated upon by processor in response to such instructions)). In some embodiments, the information processing system 200 may also include a separate computer-readable medium operably coupled to the processor for storing information and instructions as described further below.

In one embodiment, the information processing system 200 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 200, without limiting them to a specific location or implementation Validating REST with Automata According to one or more embodiments, validation of a REST service may be based on an automaton, the automaton generated based on documentation for the REST service.

Accepting messages that meet some criteria is a common problem in computer science. One technique for solving the problem is to utilize an automaton. An automaton is a state machine that transitions from an initial start state to other states based on the current input. If after the message is read the machine is in an accept state, then the message is accepted, otherwise the message does not meet the required criteria.

For validation of a REST service, the validator of FIG. 1 can be configured to determine whether any possible HTTP message meets all of the criteria defined in the documentation, and whether an HTTP message does not. By way of example, the validation according to one or more embodiments includes validator accepting the subset of all HTTP messages that are valid according to the description in the source document. According to another embodiment, the validator also needs to categorize those messages that are not valid according to the error code that should be generated by the underlying REST service, so that the error code that the REST service produces can also be verified.

According to one or more embodiments, the system and methods for validation into a representation of an automaton. In one exemplary embodiment, validation includes translating documentation of the REST service in the form of a web application description language (WADL) (either stand-alone or extracted from the contents of a RackBook document), into a representation of an automaton that can be used to validate messages as they are intercepted between functional tests and the REST service. A WADL describes a RESTful API in a machine readable format.

Figure 3:
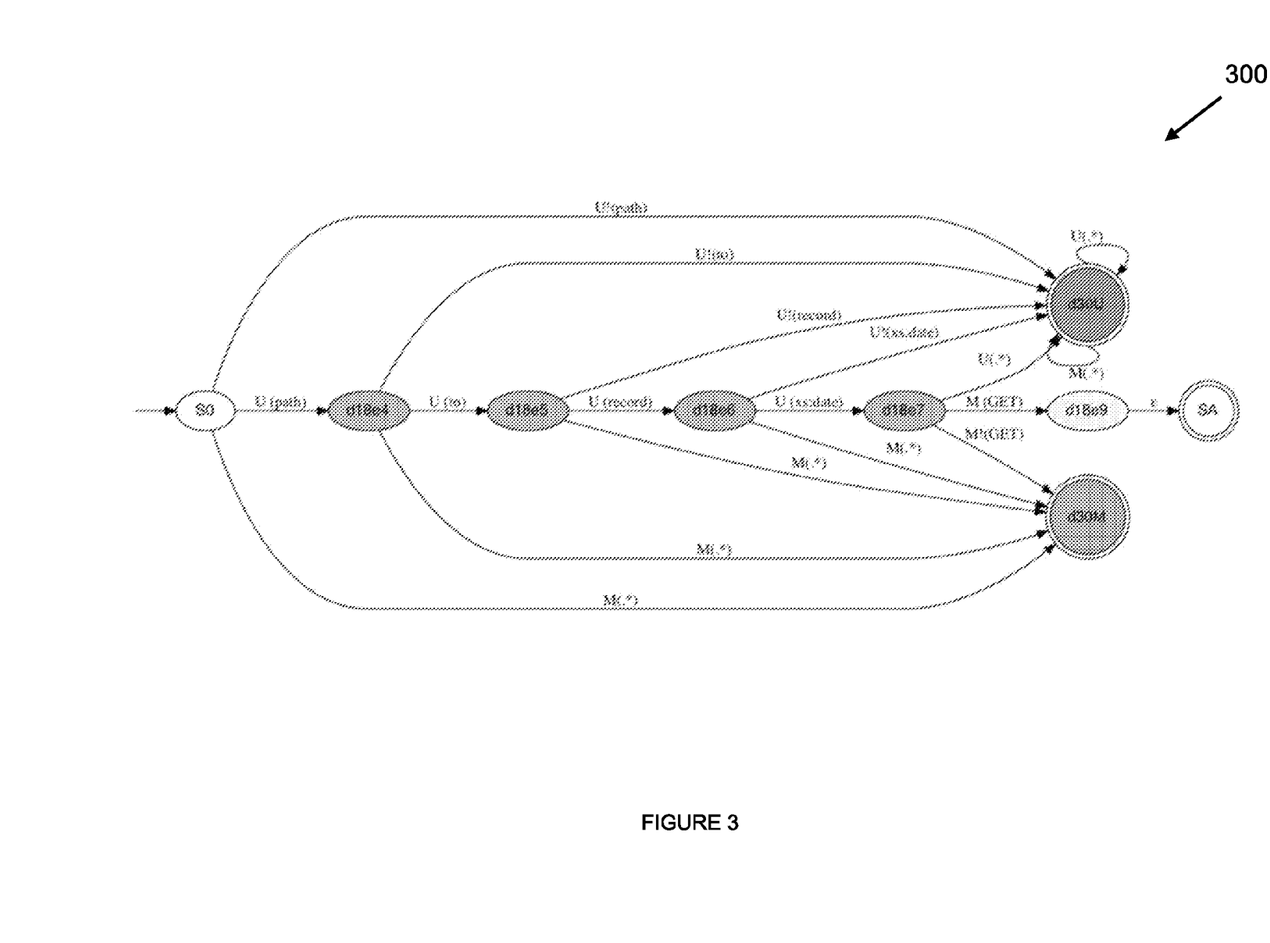
FIG. 3 is a graphical representation of an exemplary automaton as used in various embodiments.

Referring now to FIG. 3, an exemplary automaton 300 is depicted. For simplicity, the automaton 300 is only checking for conformance to the URL path and the HTTP method. In this particular API, the only allowed operation is a GET on the path /path/to/record/{date}, where {date} is an xs:date as defined by W3C XML Schema W3CSchema2010. The start state is S0. In automaton 300, there are three accept states:

1. SA: accepts HTTP messages that follow the constraints defined by the API.
2. d30U: accepts HTTP messages for which a 404 (Not Found) response should be expected from the REST service.
3. d30M: accepts HTTP messages for which a 405 (Method Not Allowed) should be expected.

Starting at state S0, the process examines the URL path, one path segment at a time. The HTTP method is not accessible until the path has been completely parsed. The transition from one state to another is based on input matches, except in the case of an transition, where a state is advanced without regard to the current input. In the automaton of FIG. 3, U(x) matches the current URL path segment to x, where x may be a regular expression or a QName representing an XML Schema simple type. U!(x), matches an URL segment that is not accepted by x. On a successful match the URL path is advanced to the next path element. After the URL path is completely read, the machine proceeds to read the HTTP Method. Here, M(x) and M!(x), work the same as U(x) and U!(x), except they match against the HTTP method instead of the URL path segment. Because the automaton is only checking for URL paths and Methods the process ends after the HTTP method has been read.

Table I illustrates the states that are transitioned based on an example set of inputs

TABLE 1

| Input | States Traveled | Result |
|---|---|---|
| GET/path/to/record/2001-01-02 | S0, d18e4, d18e5, d18e6, d18e7, d18e9, SA | 200 Okay |
| GET/my/path/ | S0, d30U, d30U, d30U | 404 Not Found |
| PUT/path/to/record/2001-01-02 | S0, d18e4, d18e5, d18e6, d18e7, d30M | 405 Bad Method |

Checker Format

Figure 4:
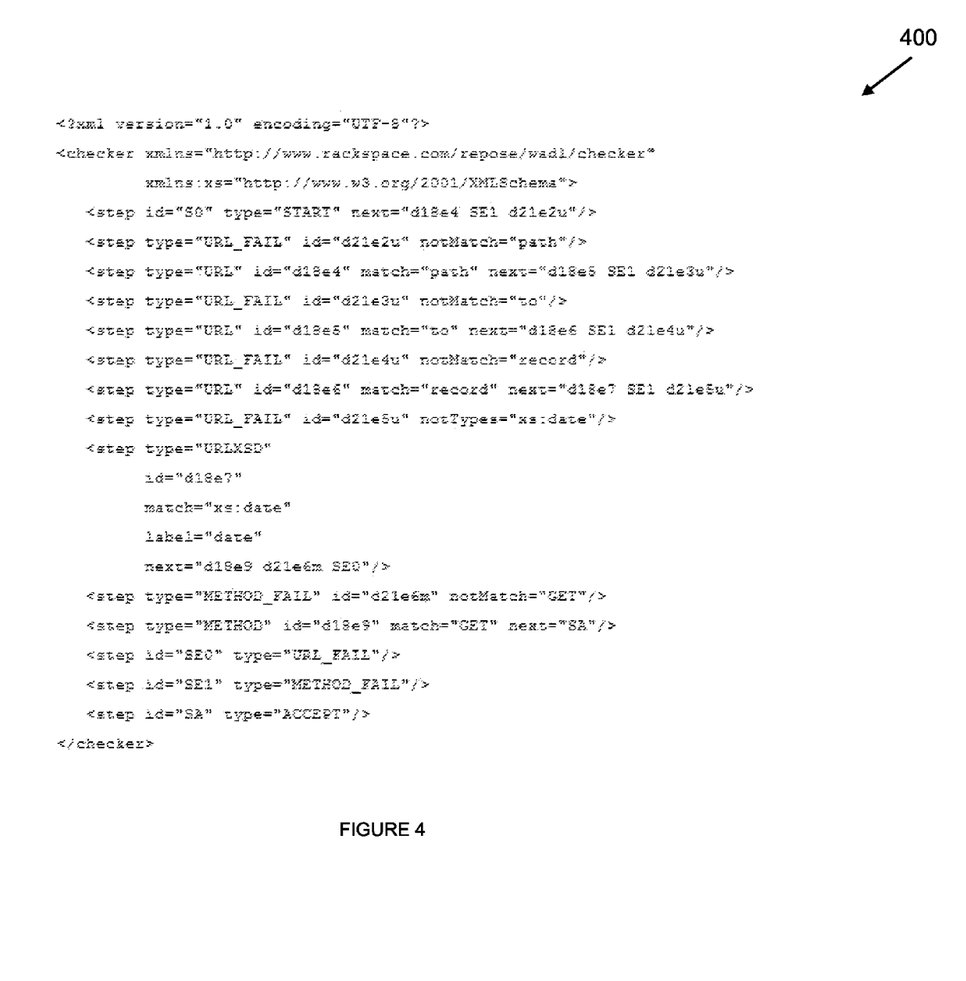
FIG. 4 depicts a representation of the automaton of FIG. 3.

Referring now to FIG. 4, diagram 400 depicts a representation of the automaton of FIG. 3. According to one embodiment, REST automata are internally represented by an XML format or checker format. Diagram 400 is an exemplary representation of automaton 300 in checker format.

According to one embodiment, checker format is a simple, terse, document type that maps each state in the state machine, along with the edges that it connects to, into a single step element. All steps in the checker format contain an id attribute of type xs:ID which uniquely identifies the step in the machine and a type attribute which indicates the type of check the step performs. In diagram 400, there are two types of URL checks: the steps that check a path segment against a regular expression are of type URL, and those that check the segment against a simple XML Schema type are of type URLXSD. Connections between steps are represented by a next attribute of type xs:IDREFs. Additionally, most steps also contain a match or notMatch attribute that provides the details of how a match is interpreted.

To match against all aspects of the HTTP request, including steps that match against request media types, steps may be taken to check the form of XML and JSON content, to validate XML via an W3C XML Schema (XSD) 1.1 validator and to check for the presence of required elements by means of XPath expressions. According to one or more embodiments, because a REST service may define many different types of elements and the element attribute in a representation binds an element to a particular operation, these aspects of REST service can be enforced via an XPath expression step in the machine.

According to another embodiment, a validator may include an XSLT checker step which performs a transformation of the request message before it is validated by the XSD step. In some cases it may seem odd that an XSLT transform may be required for validation, but the requirement comes into play in cases where the type of the request document needs to be restricted (or extended) based on the operation being performed. For example, a pattern in REST services may include a REST API dealing with Widgets that allows a Widget to have all attributes when performing a PUT operation, but restricts the POST operation to Widget documents containing only a subset of the available attributes. The restriction on POST is specified in the WADL. Validation may include using a WADL plain parameter to connect a restricted type of a widget WADL to a post operation.

Figure 5:
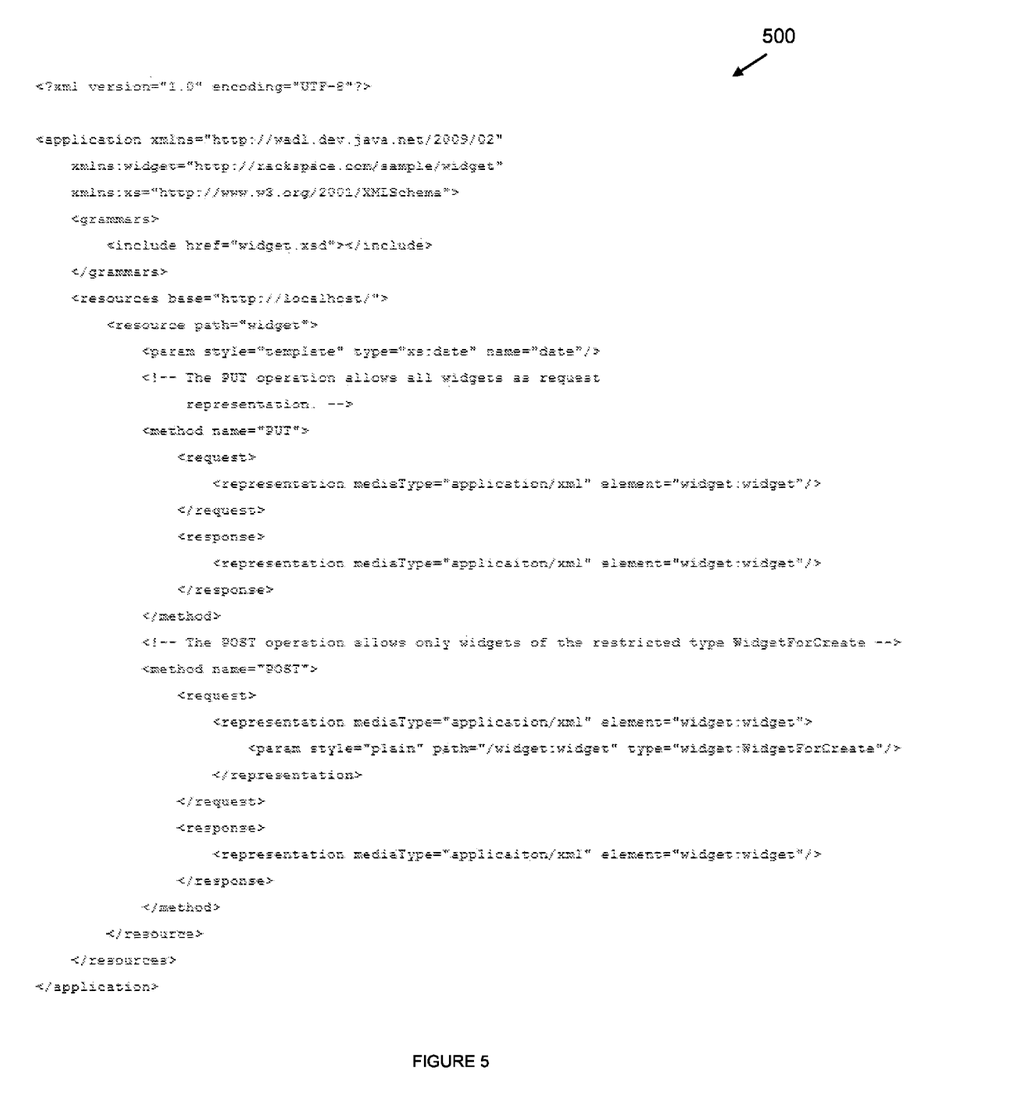
FIG. 5 is a graphical representation of a Widget WADL according to various embodiments.

FIG. 5 is a diagram 500 of a Widget WADL and illustrates a restriction on POST specified in the WADL. As shown in FIG. 5, a WADL plain parameter (plain parameters use grammars to make assertions about individual sections of the mediatype) is used to connect a restricted type (which prohibits a number of attributes) of the Widget to the POST operation, by specifying the WidgetForCreate type and an XPath of where the type should apply. In the automaton, this is translated into an XSLT step that modifies the request document by adding an xsi:type parameter, thus informing the validator to validate the contents of the Widget message as an instance of the restricted type. In this case, the restriction is made in the root document, but these types of restrictions can be placed on any element in an XML document.

Figure 6:
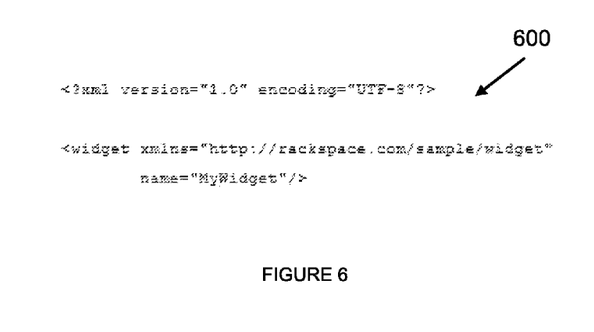
FIG. 6 is a graphical representation of a Widget Request before the XSLT step according to various embodiments.

FIG. 6 illustrates a diagram 600 of a Widget Request before the XSLT step.

Figure 7:
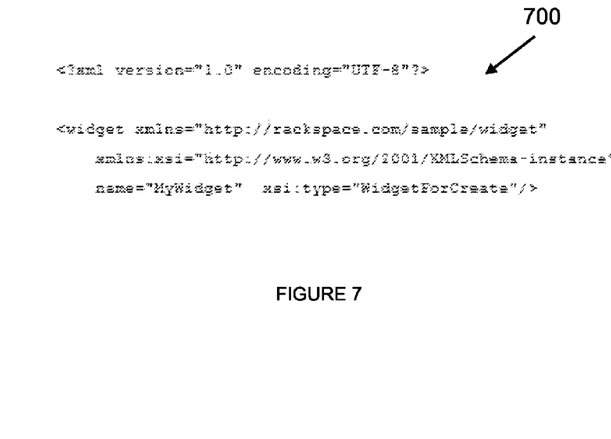
FIG. 7 is a graphical representation of a Widget request after the XSLT step according to various embodiments.

FIG. 7 illustrates diagram 700 of a Widget Request after the XSLT step.

Optimization

Figure 8A:
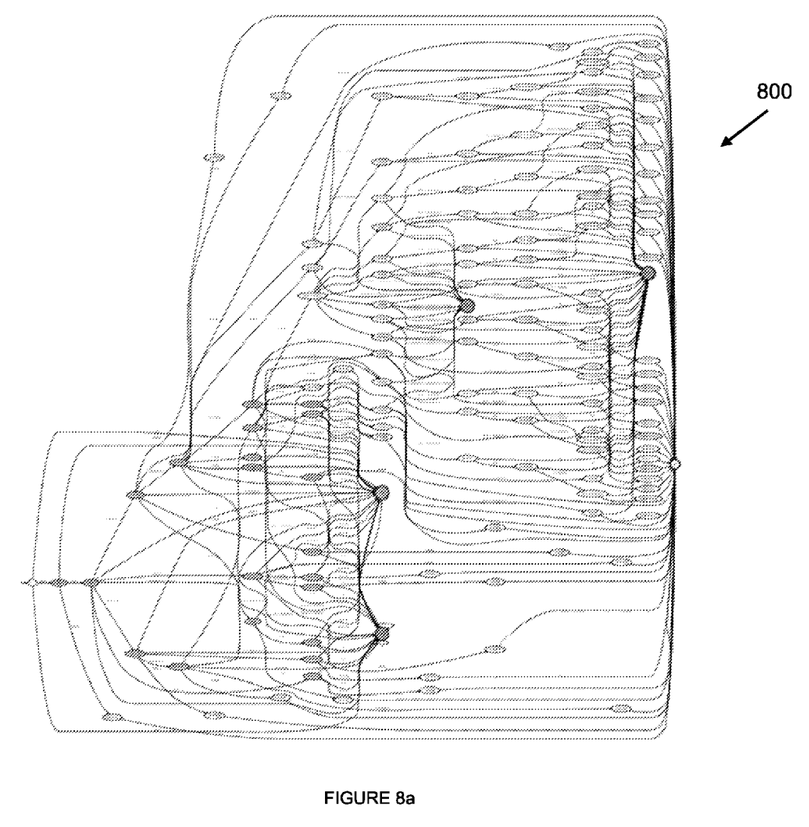
FIG. 8a illustrates a graphical representation of an automaton.

The automata created to validate REST services may be quite complex, often involving many states and connections. As an example, FIG. 8a depicts an exemplary graphical representation of an automaton 800 for validating the OpenStack Compute API (excluding extensions).

According to one or more embodiments, optimization stages may be introduced into the transformation process of REST service documentation to try to reduce the number of states in the automaton. In certain embodiments, each optimization stage is simply an XSLT that takes a checker document as input and creates a checker document with less states as output. Optimization stages can therefore be chained together. With each stage, the checker document produced should perform the exact same function as the original unoptimized one.

Figure 8B:
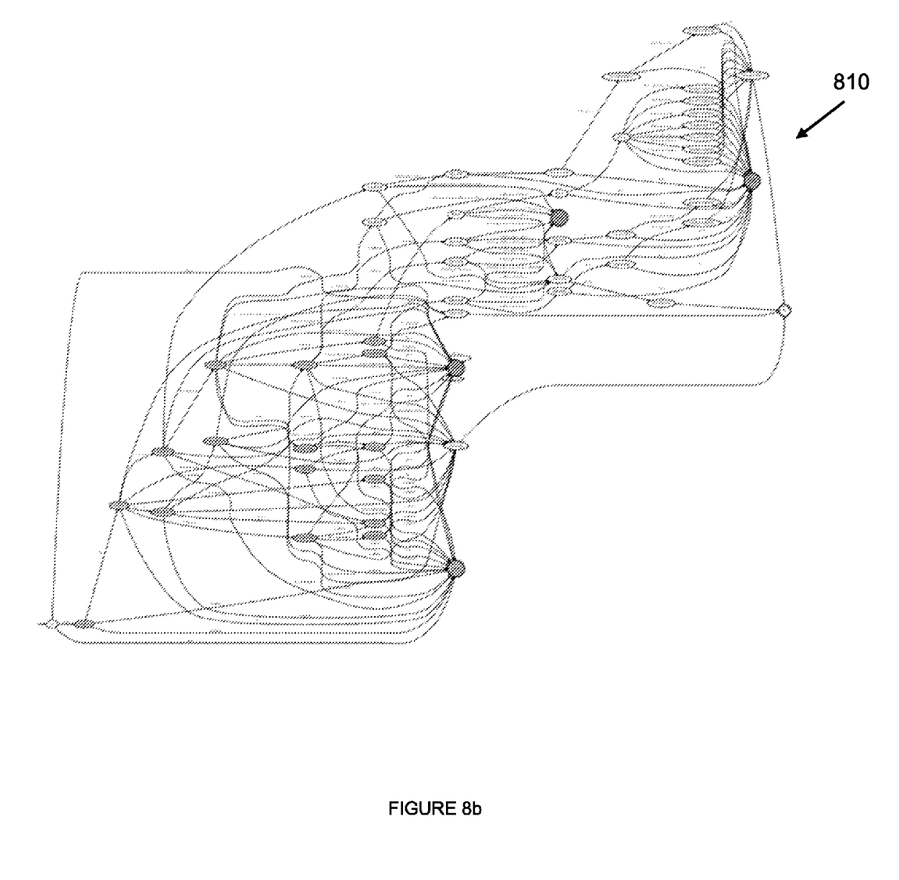

Optimization stages may be employed that compress redundant (or non-distinguishable) states into a single state. Redundant states occur quite frequently because the translation code that converts a WADL to a checker document does so without regard to the number of states produce in order to keep the translation code simple. FIG. 8b illustrates the effect of running optimization stages on the computed API of FIG. 8a. As shown in FIG. 8b, the number of states is reduced dramatically in automaton 810 realtive to automaton 800.

According to one or more other embodiments, other optimization techniques that may be employed include: converting the simple type checks in URLXSD steps into regular expression URL steps; compressing multiple regular extension checks into a single check, compressing multiple boolean XPath expressions into a single expression; and compressing XPath expressions, XSLT transformations, and XSD schema validation into a single schema aware XSLT transform step.

Validation Pipeline

According to one or more embodiments, a validation as described herein may include a validation pipeline responsible for producing REST automata from WADLs.

Figure 9:
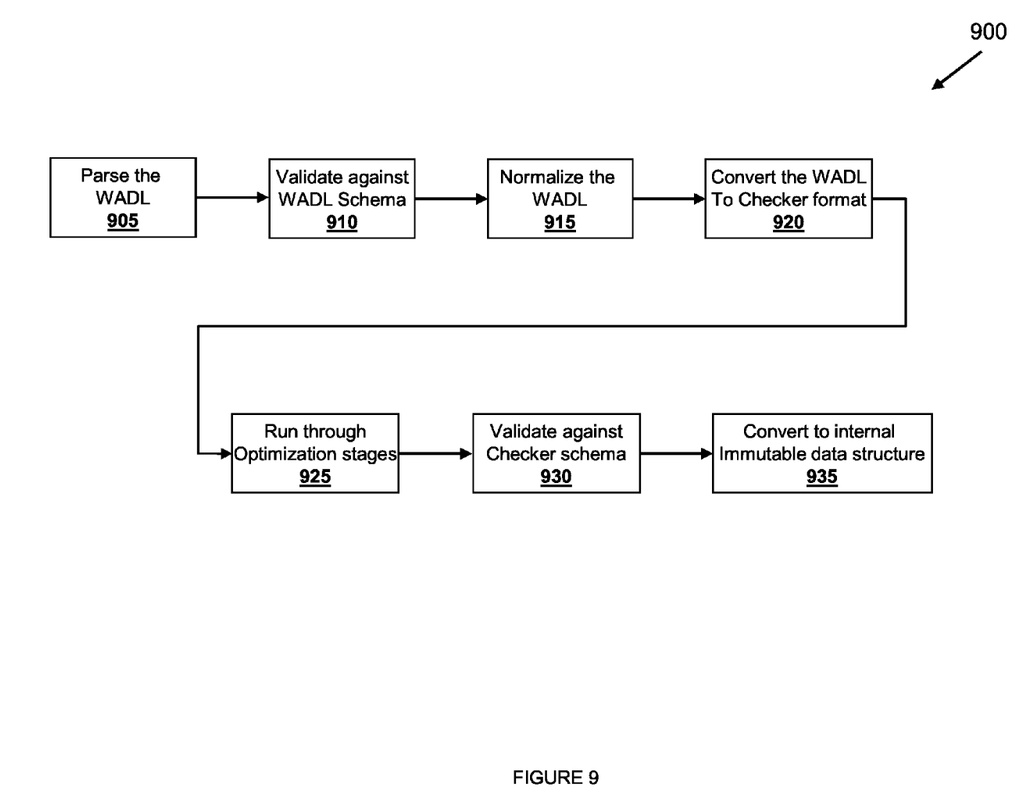
FIG. 9 illustrates a graphical illustration of a validation pipeline according to various embodiments.

Referring now to FIG. 9, a graphical illustration of a validation pipeline 900 is illustrated. Validation pipeline 900 includes parse the WADL at block 905, validate against WADL schema at block 910, normalize the WADL at block 915, convert the WADL to checker format at block 920, run through optimization stages at block 925, validate against checker schema at block 930 and convert to internal immutable data structure at block 935.

The first three parts of the pipeline 900 (e.g., block 905, 910 and 915) can be shared with a general documentation pipeline. The stages utilize XProc, XSLT2, and XSD 1.1 to generate the final checker document. The final stage, block 935 creates an immutable data structure from this document that is used by the Repose WADL proxy component to process and validate API requests within the Repose HTTP proxy. Block 935 is implemented by means of a specialized SAX handler. The data structure the handler produces is essentially a model of the automaton that can be executed by the Repose component when validating request. The process for validating HTTP request with the data structure avoids the use of global state, meaning that most content is passed via the call stack. As such, and because the internal data structure is immutable, the entire process of FIG. 9 is thread safe, meaning that it can validate multiple HTTP request simultaneously in different threads of execution.

According to one or more embodiments, validation pipeline 900 is a prepossessing step. Once the immutable data structure is created at block 935, it can be used to handle many HTTP request simultaneously, at run-time, and in an efficient manner.

Stages in the validation pipeline 900 are configurable. For example, the strictness of validation may be configured for one or more stages, wherein the strictness is determined by which validation steps should be added to the final checker. Specialized options for each individual step of the validation pipeline 900 may be configured. For example, configuring whether one or more of an XPath version 2 implementation be used in an XPath step, and whether a Saxon EE or Xerces be used for XSD 1.1 validation in the XSD step. Stages of validation pipeline 900 may also be configured based on the optimization stages to use.

In one embodiment, validation may include performing checks on the HTTP response generated by the REST service, the checks extended into the automata to account for this. In another embodiment, JSONPath and JSON Schema stages may be added in a validation pipeline. The validation pipeline may also include support for other validation languages in XML such as RelaxNG and Schematron.

In addition to validating documentation of REST services, a validator as described herein, and the validation pipeline 900, can be used to solve other problems.

Filtering and Error Reporting

REST services can receive many millions of HTTP requests a day. Many of these requests are malformed—the result of user errors. According to one embodiment, a validator, such as the validator of FIG. 1, can detect malformed requests, and filter the malformed requests from the underlying REST implementation. The validator can additionally respond with an appropriate error message. For example, rather than responding with simply a 404 (Not Found), the validator can respond with: 404 /path/to/widget not found, expecting "serverlimage" instead of "widget". According to one or more embodiments, validation may include filtering malformed messages, by the validator, from implementation of the REST service and reporting errors, by the validator, to identify documentation and REST service discrepancy.

Authorization

According to one or more embodiments, a validator is provided with capabilities based on authorization of a user. Often different sets of users can access different parts of the API. For example, administrators may have the capability to reboot a server, but regular users may not. According to one embodiment, a validator can include filtering capabilities and assign different sets of users different validators. In that fashion, administrators can have a validator that accepts the reboot operation, while regular users have a validator that does not. In this case, the documentation, such as a WADL, becomes an authorization policy file.

API Coverage

In yet another embodiment, validators can log stages in the automaton that have been visited. This information can be used to compute test coverage. If there are states in the automaton that are not visited by functional tests, then the functional tests are obviously missing something. Also, in production, the information can be used to gain insight into what parts of an API are frequently accessed by users.

The embodiments described herein provide a system and method to use a documentation pipeline for documenting REST APIs and extend the documentation pipeline to support the creation of validators that can help confirm that the documentation accurately reflects reality, or that an implementation does not drift from what is stated in the documentation for the REST service.

According to one or more embodiments, systems and methods for validating may interoperate with one or more platforms. According to another embodiment, XML media types are described with XSD 1.1 because of the open content features that are offered by the standard. OpenStack APIs are extensible, describing the XML media types with XSD 1.0 was not an option. Since OpenStack is an open and free platform, one goal is to provide developments open and accessible to the community, while still remaining friendly to enterprise customers. To that end, validators may be configured to support both the Xerces (open source) and the Saxon EE (proprietary) XSD 1.1 implementations.

Parsing XPaths in XSLT 2

WADL makes references to XPaths when describing plain parameters. According to one embodiment, XPaths need to be successfully copied as they proceed along the validation pipeline 900. Ensuring that the XPaths remain intact under all circumstances has proved difficult given that there may be conflicts with namespace prefixes, or worst, contention for the default namespace. In one embodiment, an XSLT extension may be created to keep XPath valid and that will enable leveraging an XPath 2 parser, or to write an XPath 2 parser in XSLT to resolve the issue.

Testing the Validation Pipeline

Figure 10:
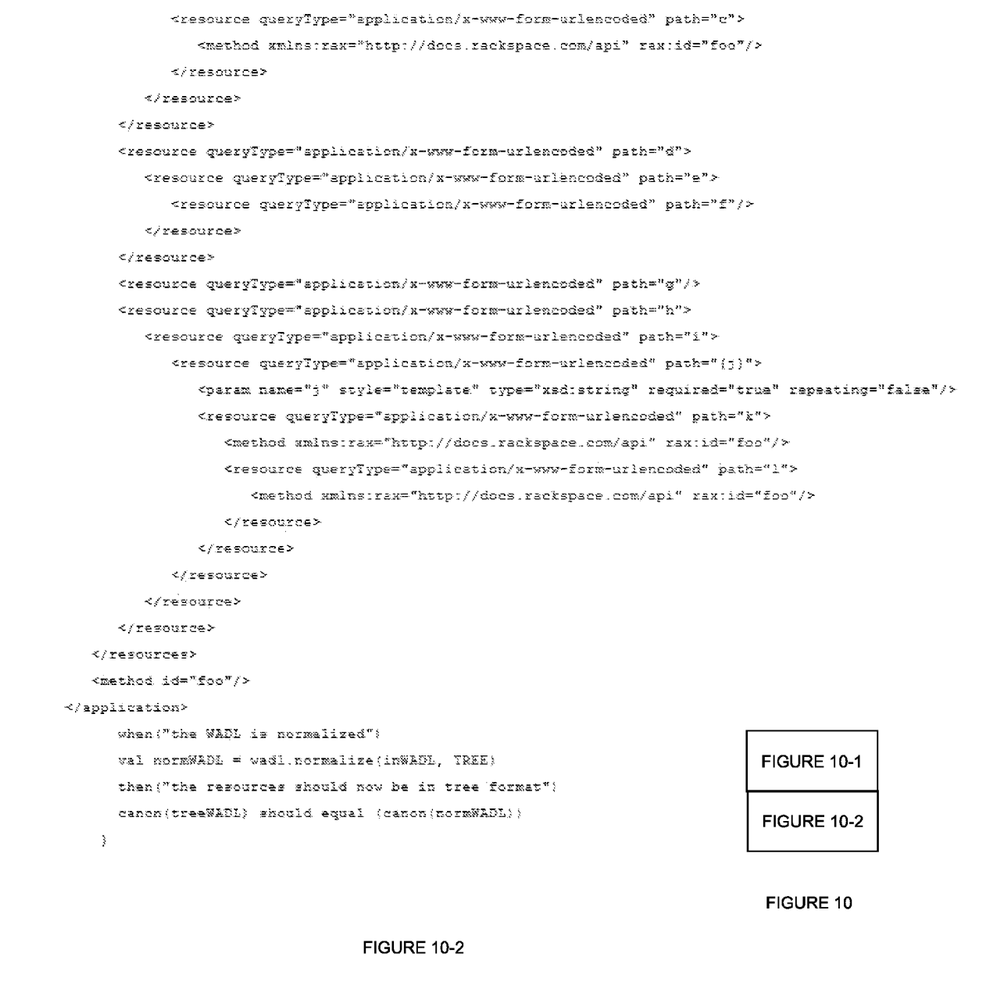
FIG. 10 illustrates a code sample according to various embodiments.

Because validation and our documentation pipeline both rely on the WADL normalizer, it is important to ensure that the output of the normalizer accurately reflects the intent of the original WADL author. In on embodiment, a functional testing framework is provided to avoid regression, the framework takes advantage of the XML features of Scala to perform transformations on simple WADLs and WADL+ XSD combinations and compare those with the expected result. The code sample in FIG. 10 depicts a graphical representation of such a test according to one or more embodiments.

Even though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for validating documentation of a representational state transfer (REST) service, the method comprising:

detecting, by a validator, one or more messages for a REST service;

translating, by the validator, documentation of the REST service into a representation of an automaton, wherein the automaton is a state machine that transitions from an initial start state to other states based on one or more current inputs;

validating, based on the automaton, the one or more messages wherein validation of the one or more messages determines conformance of the REST service to the documentation of the REST service;

after validating the one or more messages, categorizing, by the validator, a message that is not valid in accordance with a first error code that is expected to be generated by the REST service;

receiving a response from the REST service, the response including a second error code produced by the REST service in response to processing the message; and verifying whether the first error code matches the second error code.

2. The method of claim 1, wherein the one or more messages include at least one of client and server application messages.

3. The method of claim 1, wherein the one or more messages are functional test messages for testing functions of the REST service.

4. The method of claim 1, wherein the documentation is a machine readable description of the XML Web Application Description Language (WADL).

5. The method of claim 1, wherein translating documentation of the REST service includes parsing the documentation, validating the documentation against schema, and normalizing the documentation.

6. The method of claim 1, wherein the automaton is a representation in an XML format of URL paths and URI resources for validating messages for the REST service.

7. The method of claim 1, further comprising optimizing the automaton by reducing one or more of stages and paths of the automaton.

8. The method of claim 1, wherein translating documentation of the REST service includes reducing the number of states of the automaton, wherein each optimization stage is an XSLT that takes a checker document as input and creates a checker document with less states as output.

9. The method of claim 7, wherein optimizing includes one or more of converting simple type checks in URLXSD steps into regular expression URL steps, compressing multiply regular extension check into a single check, and compressing multiple Boolean XPATH expressions into a single expression.

10. The method of claim 1, wherein validating the one or more messages is performed as a preprocessing step.

11. The method of claim 1, wherein the validator is incorporated into existing REST services and does not require a change to existing functions of the REST service.

12. The method of claim 1, wherein the validator checks for drift simultaneously between REST services and functional tests for the REST service.

13. The method of claim 1, further comprising a XSLT checker step to perform a transformation of a message before validating the message.

14. The method of claim 1, further comprising using a WADL plain parameter to connect a restricted type of a widget WADL to a post operation.

15. The method of claim 1, wherein validating includes parsing a machine-readable XML description of HTTP-based web applications to translate documentation;

validating documentation of the REST service against WADL schema;

normalizing the WADL;

converting the WADL to a checker format;

running through the optimization stages; and validating the message against checker schema.

16. The method of claim 1, further comprising filtering malformed messages, by the validator, from implementation of the REST service and reporting errors, by the validator, to identify documentation and REST service discrepancy.

17. The method of claim 1, wherein the validator is provided with capabilities based on authorization of a user.

18. The method of claim 1, wherein the validator logs stages of the automaton that are visited.

19. A non-transitory computer-accessible storage medium storing program instructions that when executed by a computer cause the computer to implement a representational state transfer (REST) service validator configured to:
translate documentation of the REST service into a representation of an automaton, wherein the automaton is a state machine that transitions from an initial start state to other states based on one or more current inputs;
validate, based on the automaton, the one or more messages, wherein validation of the one or more messages determines conformance of the REST service to the documentation of the REST service, wherein after validating the one or more messages, the validator is further configured to:
categorize a message that is not valid in accordance with a first error code that is expected to be generated by the REST service;
receive a response from the REST service, the response including a second error code produced by the REST service in response to processing the message; and
verify whether the first error code matches the second error code.

20. The non-transitory computer-accessible storage medium of claim 19, wherein the one or more messages include at least one of client and server application messages.

21. The non-transitory computer-accessible storage medium of claim 19, wherein the one or more messages are functional test messages for testing functions of the REST service.

22. The non-transitory computer-accessible storage medium of claim 19, wherein the documentation is a machine readable description of the XML Web Application Description Language (WADL).

23. The non-transitory computer-accessible storage medium of claim 19, wherein translating documentation of the REST service include parsing the documentation, validating the documentation against schema, and normalizing the documentation.

24. The non-transitory computer-accessible storage medium of claim 19, wherein the automaton is a representation in an XML format of URL paths and URI resources for validating messages for the REST service.

25. The non-transitory computer-accessible storage medium of claim 19, further comprising optimizing the automaton by reducing one or more of stages and paths of the automaton.

26. The non-transitory computer-accessible storage medium of claim 19, wherein translating documentation of the REST service includes reducing the number of states of the automaton, wherein each optimization stage is an XSLT that takes a checker document as input and creates a checker document with less states as output.

27. The non-transitory computer-accessible storage medium of claim 25, wherein optimizing includes one or more of converting simple type checks in URLXSD steps into regular expression URL steps, compressing multiply regular extension check into a single check, and compressing multiple Boolean XPATH expressions into a single expression.

28. The non-transitory computer-accessible storage medium of claim 19, wherein validation of the one or more messages is performed as a preprocessing step.

29. The non-transitory computer-accessible storage medium of claim 19, wherein the validator is incorporated into existing REST services and does not require a change to existing functions of the REST service.

30. The non-transitory computer-accessible storage medium of claim 19, wherein the validator checks for drift simultaneously between REST services and functional tests for the REST service.

31. The non-transitory computer-accessible storage medium of claim 19, further comprising a XSLT checker step to perform a transformation of a message before validating the message.

32. The non-transitory computer-accessible storage medium of claim 19, further comprising using a WADL plain parameter to connect a restricted type of a widget WADL to a post operation.

33. The non-transitory computer-accessible storage medium of claim 19, wherein validation includes
parsing the machine-readable XML description of HTTP-based web applications to translate documentation;
validating documentation against WADL schema;
normalizing the WADL;
converting the WADL to a checker format;
running through the optimization stages; and
validating messages against checker schema.

34. The non-transitory computer-accessible storage medium of claim 19, further comprising filtering malformed messages, by the validator, from implementation of the REST service and reporting errors, by the validator, to identify documentation and REST service discrepancy.

35. The non-transitory computer-accessible storage medium of claim 19, wherein the validator is provided with capabilities based on authorization of a user.

36. The non-transitory computer-accessible storage medium of claim 19, wherein the validator logs stages of the automaton that are visited.

* * * * *

UNITED STATES PATENT AND TRADEMARK OFFICE
CERTIFICATE OF CORRECTION

| | | |
|---|---|---|
| PATENT NO. | : 9,621,440 B2 | Page 1 of 1 |
| APPLICATION NO. | : 14/013930 | |
| DATED | : April 11, 2017 | |
| INVENTOR(S) | : Jorge Luis Williams and David Cramer | |

It is certified that error appears in the above-identified patent and that said Letters Patent is hereby corrected as shown below:

In the Claims

Column 11, Line 11 (Claim 10), insert -- detect one or more messages for a REST service; -- therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*